United States Patent
Sutkowski et al.

(10) Patent No.: US 9,943,718 B2
(45) Date of Patent: Apr. 17, 2018

(54) METHODS AND APPARATUS TO POWER AN EXERCISE MACHINE

(71) Applicant: Brunswick Corporation, Lake Forest, IL (US)

(72) Inventors: Robert Sutkowski, Homer Glen, IL (US); John Michael Wong, Buffalo Grove, IL (US); Ferdinand David, Hainesville, IL (US); Ming Jiang, Villa Park, IL (US)

(73) Assignee: BRUNSWICK CORPORATION, Lake Forest, IL (US)

( * ) Notice: Subject to any disclaimer, the term of this patent is extended or adjusted under 35 U.S.C. 154(b) by 0 days.

(21) Appl. No.: 15/682,237

(22) Filed: Aug. 21, 2017

(65) Prior Publication Data

US 2017/0340913 A1    Nov. 30, 2017

Related U.S. Application Data

(60) Continuation of application No. 15/412,851, filed on Jan. 23, 2017, now Pat. No. 9,737,746, which is a
(Continued)

(51) Int. Cl.
*G01P 3/46* (2006.01)
*A63B 21/005* (2006.01)
(Continued)

(52) U.S. Cl.
CPC ...... *A63B 21/0055* (2015.10); *A63B 22/0056* (2013.01); *A63B 22/0605* (2013.01);
(Continued)

(58) Field of Classification Search
CPC .................. H02P 9/00; H02P 9/48; F03G 5/06
(Continued)

(56) References Cited

U.S. PATENT DOCUMENTS 3,240,947 A * 3/1966 Mas .......................... H02J 9/08
290/50
3,511,097 A * 5/1970 Corwin .................. A61B 5/221
324/142
(Continued)

FOREIGN PATENT DOCUMENTS

IT   WO 2011083434 A1 *  7/2011   ......... A63B 21/0058
WO      2011083434      7/2011

OTHER PUBLICATIONS

United States Patent and Trademark Office, "Non-Final Office Action," issued in connection with U.S. Appl. No. 14/026,928, dated Jul. 1, 2016, 5 pages.
(Continued)

*Primary Examiner* — Jermele M Hollington
*Assistant Examiner* — Sean Curtis
(74) *Attorney, Agent, or Firm* — Hanley, Flight & Zimmerman, LLC

(57) ABSTRACT

Methods and apparatus to power an exercise machine are disclosed herein. An example exercise machine includes a power receiver to measure a power output by a generator that is to convert movement of a moveable part into electric power, the power receiver is to calculate a rotations per minute of the moveable part. A mode controller is to calculate a power supply duty cycle based on the power output by the generator, the rotations per minute of the moveable part, and a user selected wattage. A power output controller is to control power provided to a console of the exercise machine based on the power supply duty cycle.

20 Claims, 10 Drawing Sheets

Related U.S. Application Data division of application No. 14/026,928, filed on Sep. 13, 2013, now Pat. No. 9,579,534.

(60) Provisional application No. 61/701,400, filed on Sep. 14, 2012.

(51) Int. Cl.

| | | |
|---|---|---|
| *A63B 22/00* | (2006.01) | |
| *A63B 22/06* | (2006.01) | |
| *A63B 71/06* | (2006.01) | |
| *F03G 5/06* | (2006.01) | |
| *H02P 9/04* | (2006.01) | |
| *H02P 27/08* | (2006.01) | |
| *A63B 24/00* | (2006.01) | |

(52) U.S. Cl.
CPC ...... *A63B 22/0664* (2013.01); *A63B 24/0087* (2013.01); *A63B 71/0619* (2013.01); *F03G 5/06* (2013.01); *H02P 9/04* (2013.01); *H02P 27/08* (2013.01); *A63B 2220/54* (2013.01)

(58) Field of Classification Search
USPC ............ 324/177–178; 340/664; 73/511, 73/379.02–379.09; D21/662; 482/1–9, 482/51–52, 54, 57, 64–65
See application file for complete search history.

(56) References Cited

U.S. PATENT DOCUMENTS

| | | | |
|---|---|---|---|
| 4,084,810 A * | 4/1978 | Forsman | A61B 5/221 188/159 |
| 4,235,437 A | 11/1980 | Ruis et al. | |
| 4,519,604 A * | 5/1985 | Arzounian | A63B 22/0087 482/133 |
| 4,612,447 A * | 9/1986 | Rowe | F03G 5/08 290/1 R |
| 4,776,587 A | 10/1988 | Carlson et al. | |
| 4,817,939 A * | 4/1989 | Augspurger | A63B 22/16 482/2 |
| 5,050,865 A * | 9/1991 | Augspurger | A63B 24/00 482/2 |
| 5,195,935 A | 3/1993 | Fencel | |
| 5,205,801 A * | 4/1993 | Haner | A63B 21/0053 482/63 |
| 5,254,061 A * | 10/1993 | Leask | A63B 21/0052 482/5 |
| 5,512,025 A * | 4/1996 | Dalebout | A63B 21/015 482/54 |
| 5,547,439 A * | 8/1996 | Rawls | A63B 24/00 482/3 |
| 5,761,387 A * | 6/1998 | Yamada | G05B 19/41865 700/28 |
| 6,160,955 A * | 12/2000 | Bicciato | A63B 22/02 318/434 |
| 6,418,797 B1 * | 7/2002 | Ambrosina | B62M 6/40 73/862.29 |
| 6,443,875 B1 * | 9/2002 | Golen, Jr. | A63B 22/02 482/51 |
| 6,450,922 B1 * | 9/2002 | Henderson | A63B 24/0006 482/4 |
| 6,602,168 B2 * | 8/2003 | Duke | A63B 21/154 482/51 |
| 6,921,351 B1 * | 7/2005 | Hickman | G06F 19/3481 482/4 |
| 7,179,202 B2 | 2/2007 | Marin et al. | |
| 7,722,503 B1 * | 5/2010 | Smith | A63B 24/0062 482/1 |
| 7,833,135 B2 * | 11/2010 | Radow | A63B 22/0605 482/4 |
| 7,976,434 B2 * | 7/2011 | Radow | A63B 21/00196 482/5 |
| 8,888,660 B1 | 11/2014 | Oteman | |
| 8,894,547 B2 * | 11/2014 | Bruno | A63B 71/0619 482/1 |
| 9,067,099 B2 * | 6/2015 | Beard | A63B 21/0053 |
| 9,278,248 B2 * | 3/2016 | Tyger | A63B 22/0257 |
| 9,314,667 B2 * | 4/2016 | Puerschel | A63B 24/0087 |
| 9,579,534 B2 * | 2/2017 | Sutkowski | A63B 21/0053 |
| 9,737,746 B2 * | 8/2017 | Sutkowski | A63B 21/0055 |
| 2005/0043145 A1 | 2/2005 | Anderson et al. | |
| 2005/0181911 A1 * | 8/2005 | Porth | A63B 22/001 482/52 |
| 2007/0042868 A1 * | 2/2007 | Fisher | A63B 24/0084 482/8 |
| 2007/0197345 A1 * | 8/2007 | Wallace | A63B 21/154 482/8 |
| 2007/0254778 A1 * | 11/2007 | Ashby | A63B 22/001 482/5 |
| 2008/0096725 A1 * | 4/2008 | Keiser | A63B 21/0051 482/8 |
| 2008/0096728 A1 | 4/2008 | Keiser | |
| 2008/0207402 A1 * | 8/2008 | Fisher | A63B 21/0051 482/5 |
| 2009/0011907 A1 * | 1/2009 | Radow | A63B 24/0084 482/57 |
| 2009/0111658 A1 * | 4/2009 | Juan | A63B 21/0058 482/5 |
| 2009/0118099 A1 * | 5/2009 | Fisher | A63B 21/0052 482/5 |
| 2010/0022354 A1 * | 1/2010 | Fisher | A63B 22/0605 482/8 |
| 2010/0035726 A1 * | 2/2010 | Fisher | A63B 24/0084 482/8 |
| 2011/0165997 A1 * | 7/2011 | Reich | A63B 21/0058 482/5 |
| 2012/0238406 A1 * | 9/2012 | Beard | A63B 21/0053 482/2 |
| 2013/0059698 A1 * | 3/2013 | Barton | A63B 71/0622 482/63 |
| 2014/0077494 A1 | 3/2014 | Sutkowski et al. | |
| 2014/0113768 A1 * | 4/2014 | Lin | A63B 71/0619 482/5 |
| 2014/0113769 A1 * | 4/2014 | Liu | A63B 22/02 482/8 |
| 2014/0171266 A1 * | 6/2014 | Hawkins | A63B 24/0087 482/5 |

OTHER PUBLICATIONS

United States Patent and Trademark Office, "Notice of Allowance," issued in connection with U.S. Appl. No. 14/026,928, dated Oct. 18, 2016, 10 pages.

United States Patent and Trademark Office, "Notice of Allowance," issued in connection with U.S. Appl. No. 15/412,851, dated Apr. 12, 2017, 8 pages.

* cited by examiner

METHODS AND APPARATUS TO POWER AN EXERCISE MACHINE

RELATED APPLICATION

This patent arises from a continuation of U.S. patent application Ser. No. 15/412,851, filed on Jan. 23, 2017, and entitled "METHODS AND APPARATUS TO POWER AN EXERCISE MACHINE", which is a divisional of U.S. patent application Ser. No. 14/026,928, filed on Sep. 13, 2013, and entitled "METHODS AND APPARATUS TO POWER AN EXERCISE MACHINE," which claims the benefit of U.S. Provisional Patent Application Ser. No. 61/701,400, which was filed on Sep. 14, 2012. U.S. patent application Ser. No. 15/412,851, U.S. patent application Ser. No. 14/026,928 and U.S. Provisional Patent Application Ser. No. 61/701,400 are hereby incorporated herein by reference in their entireties.

FIELD OF THE DISCLOSURE

This disclosure relates generally to exercise machines and, more particularly, to methods and apparatus to power an exercise machine.

BACKGROUND

Exercise machines such as stationary bikes, elliptical trainers, and steppers typically include a console that allows the user to select exercise programs and provide other functions such as, for example, entertainment, workout statistics, etc. Some exercise machines include additional electronics such as a television and/or provide power to other external devices such as smartphones, tablets, etc. Operating the console and/or the additional electronics requires additional electrical power that must be provided to the exercise machine.

DETAILED DESCRIPTION

Figure 1:
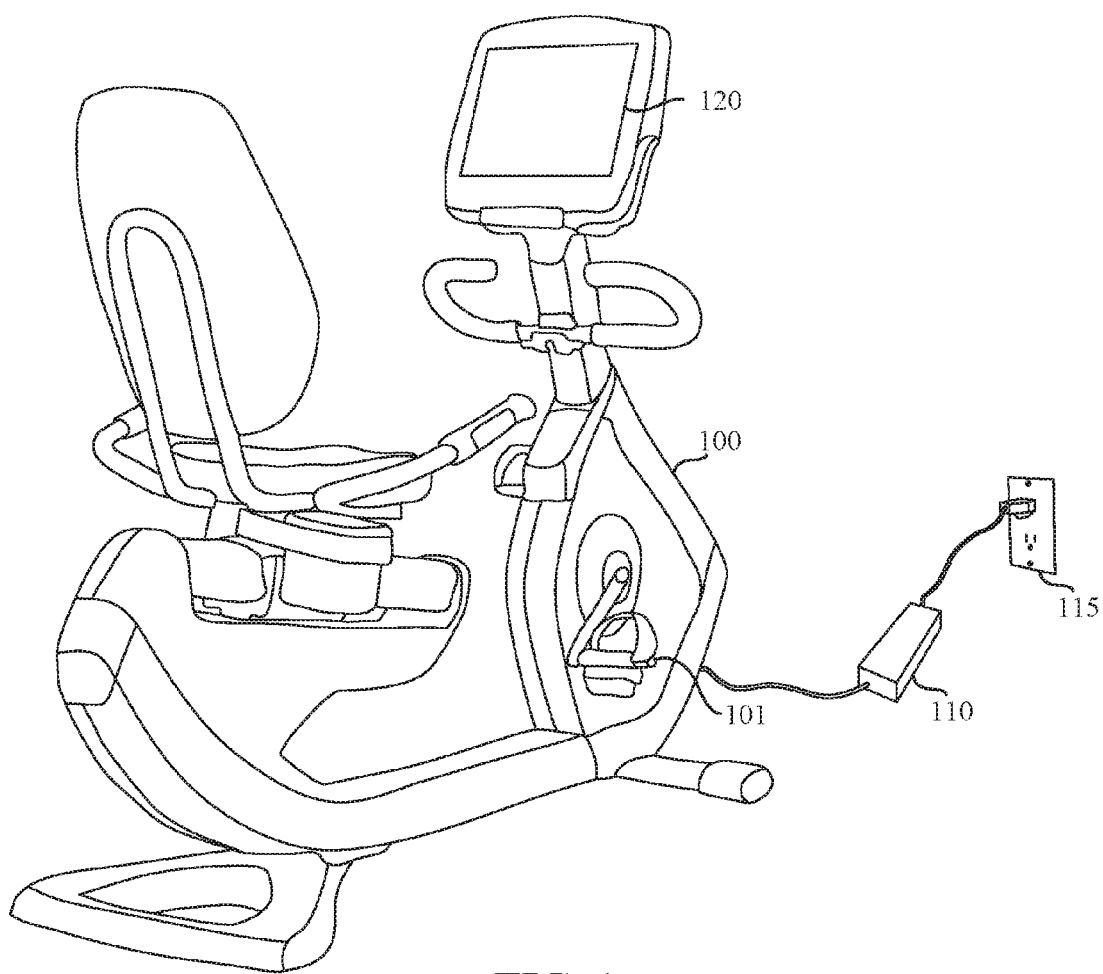
FIG. 1 illustrates an example exercise apparatus.

Exercise machines that provide consoles to users power those consoles with various power sources. Exercise machines are traditionally powered by an external power source (e.g., a power outlet and/or a power adapter). Some exercise machines are self-powered and, in that case, the power used to operate the console is generated by the user. An example self-powered exercise machine includes an alternator and/or a generator as part of a load device that enables generation of electricity to power the console. Some self-powered systems include a battery to provide continuous power to the console (e.g., if there is a pause in the workout).

The power available to the console in a self-powered exercise machine is limited by the electrical power generated by the user. Consoles that include televisions and other advanced features may require a significant amount electrical power that the user may not be able to generate. For example, some users (e.g., elderly persons, rehabilitation patients, etc.) may need to exercise at a very low level and may not generate enough electrical power to operate the console. In some examples, the self-powered exercise machine receives power from an external power supply that powers the exercise machine when the user generates an insufficient amount of electrical power.

In the examples disclosed herein, a hybrid mode is used to power the console using electrical power generated by the user and received simultaneously from a power supply. When the user is generating sufficient power (e.g., a power level over a threshold), the power generated by the user is delivered to the console rather than from the power supply. In some examples, light users (e.g., rehabilitation patients, elderly persons, etc.) may not achieve the threshold level of power. However, other users may power the console through their exercise efforts.

Combining power from the power supply and generated by the user enables less power to be drawn from external power sources (e.g., commercial electricity). Accordingly, the amount of electrical power used to operate the exercise machine and, consequently, the costs of electricity used to operate the exercise machine are reduced. In the setting of a gym and/or workout center, the electricity and/or cost savings may be significant. Furthermore, in some examples, electricity generated by a user on a first exercise machine may be used to power a console and/or other electronics on a second exercise machine (e.g., when there is a surplus of user-generated electricity at the first exercise machine).

The examples disclosed herein enable a user to select a level of effort (e.g., a workout resistance) independent of the power draw required by the console and/or additional electronic devices (e.g., a television, an Apple iPod™, a smartphone, a tablet computer, etc.). Resistance levels provided to the user (e.g., to simulate a more strenuous workout) are controlled to ensure that the user still feels the same amount of resistance regardless of the electrical power that is generated by the user.

In the examples disclosed herein, electricity or electrical power is received from a first power supply (e.g., a power supply external to the exercise machine) and is provided in parallel with electrical power received from a second power supply (e.g., a generator that generates electricity based on user input) to power electronics of the exercise machine (e.g., a console, a television). In addition to the second supply, an additional load is added to the generator when a higher level of exercise is selected by the user than would be delivered by supplying the full power to the electronics of the exercise machine. The output of the second power supply is controlled to provide all or part of the power to the electronics of the exercise machine and/or to provide all or part of the resistance to the user.

FIG. 1 illustrates an example exercise machine 100. In the illustrated example, the exercise machine 100 is a stationary bike. However, any other type of exercise machine 100 may additionally or alternatively be used such as, for example, an elliptical trainer, a stepper, etc. The exercise machine 100 of the illustrated example receives electrical power from a power supply 110. The power supply 110 receives electricity from a commercial power source 115 (e.g., an electrical outlet). In the illustrated example, the power supply 110 is separate from (e.g., external to) the exercise machine 100. However, in some examples, the power supply 110 may be integral and/or internal to the exercise machine 100.

In the illustrated example, the exercise machine 100 includes a console 120. The console 120 of the illustrated example of FIG. 1 is a touchscreen display. However any other type(s) and/or format(s) of consoles may additionally or alternatively be used. In the illustrated example, the console 120 functions as a television that may be used to, for example, entertain a user during a workout. In some examples, the console 120 enables a user to plug in one or more optional attachable device(s) 122 such as, for example, a television, a smartphone, a tablet pc, an mp3 player, a computer display, etc. In some examples, the console 120 provides power to these attachable external device(s) 122 using a power converter such as, for example, a twelve-volt buck converter. However, any other type and/or number of converters may additionally or alternatively be used. For example, a five volt converter may be used to provide power to a device connected via a Universal Serial Bus (USB) port and/or USB cable.

Figure 2:
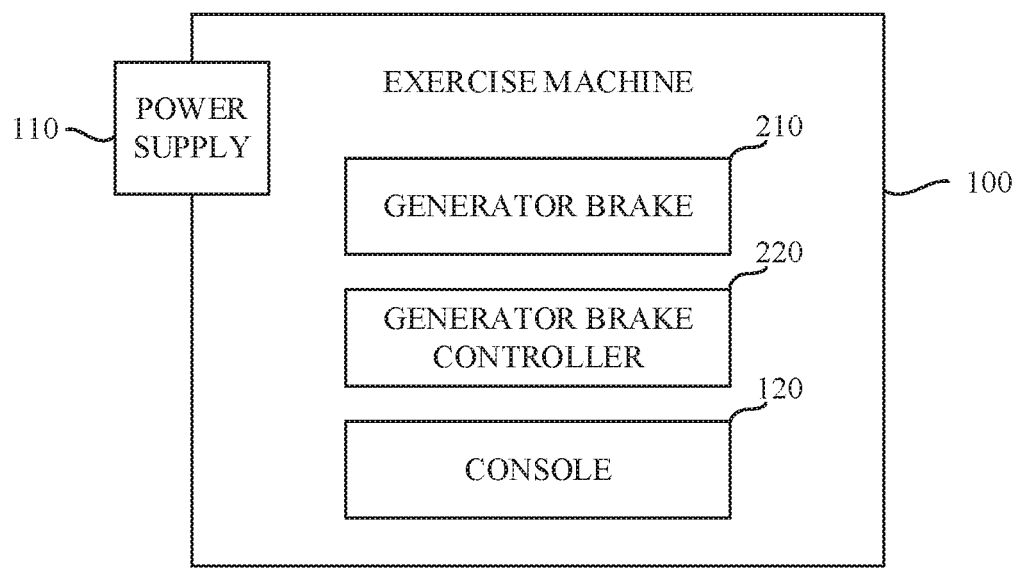
FIG. 2 is a block diagram of the example exercise machine of FIG. 1

FIG. 2 is a block diagram of the example exercise machine 100 of FIG. 1. The exercise machine 100 includes a generator brake 210, a generator brake controller 220, and the console 120. In the illustrated example, the exercise machine 100 includes the power supply 110. However, as described above, the power supply 110 may be internal and/or external with respect to the exercise machine 100.

The generator brake 210 interfaces with the user of the exercise machine 100 to receive movement of the user and convert that movement or mechanical power into electricity or electrical power. In the illustrated example, the generator brake 210 receives movement of the user via a moveable part such as, for example, a pedal 101. Furthermore, the generator brake 210 provides a variable resistance level to the user, enabling varying degrees of input energy required by the user during a workout. In some examples, the generator brake 210 may be implemented using a generator (e.g., a high efficiency generator) loaded by a resistor that may be controlled using a pulse-width modulated (PWM) signal to control the resistance felt by the user. In the illustrated example, the generator brake 210 is implemented by a generator loaded by a resistor. However, the generator brake 210 may be implemented in any other fashion such as, for example, an automotive alternator with a resistive load, a permanent magnet generator with a resistive load, etc.

The generator brake controller 220 of the illustrated example is implemented by a processor executing instructions but could, alternatively, be implemented by an application specific integrated circuit(s) (ASIC(s)), programmable logic device(s) (PLD(s)) and/or field programmable logic device(s) (FPLD(s)), or other analog and/or digital circuitry. In the illustrated example, the generator brake controller 220 measures power output by the generator brake 210, controls the resistance level of the generator brake 210, and provides power to the console 120.

Figure 3:
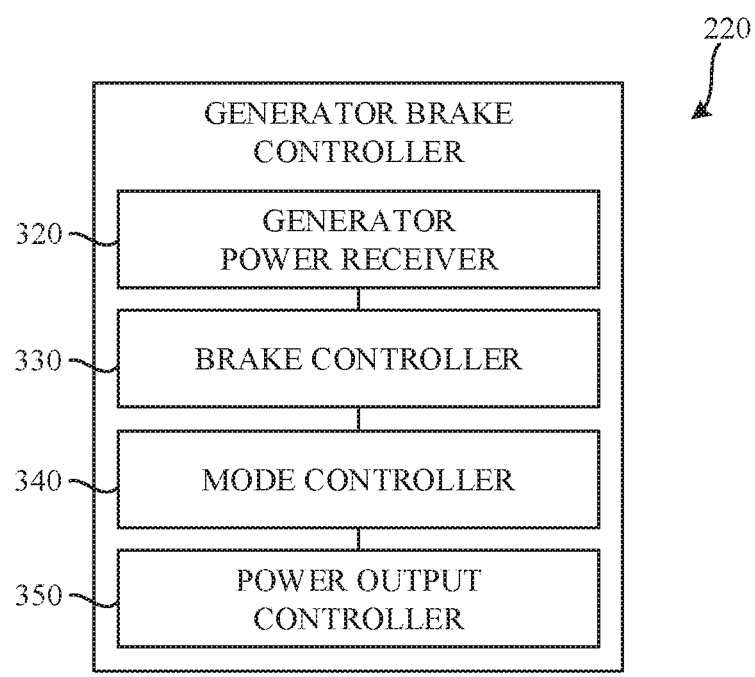
FIG. 3 is a block diagram of an example generator brake controller of the illustrated example of FIG. 2.

FIG. 3 is a block diagram of an example generator brake controller 220 of the illustrated example of FIG. 2. The example generator brake controller 220 of FIG. 3 includes a generator power receiver 320, a brake controller 330, a mode controller 340, and a power output controller 350.

The generator power receiver 320 of the illustrated example of FIG. 3 is implemented by a three-phase rectifier with an output capacitor, a resistor divider, and a square wave converter. The operation of the generator power receiver 320 is described in detail in connection with FIG. 4.

The brake controller 330 of the illustrated example of FIG. 3 is implemented by a switch that controls current flowing through a brake (referred to herein as a brake current) of the generator brake 210. In the illustrated example, the switch is implemented by a metal oxide semiconductor field effect transistor (MOSFET). However, the switch may be implemented by any other type of switch such as, for example, a transistor, a relay, a potentiometer, a rheostat, etc. In the illustrated example, the brake current is controlled by switching the switch using a pulse width modulated signal received from the mode controller. In the illustrated example, the brake current is monitored to provide a closed loop control of the resistance of the exercise machine experienced by the user.

The mode controller 340 of the illustrated example of FIG. 3 is implemented by a processor executing instructions but could, alternatively, be implemented by an ASIC, PLD, FPLD, or other analog and/or digital circuitry. In the illustrated example, the mode controller measures power output by the generator brake 210, controls the resistance level of the generator brake 210 via the brake controller 330, and provides power to the console 120 via the power output controller 350.

The power output controller 350 of the illustrated example of FIG. 3 is implemented by a first rectifier and a second rectifier positioned in a wired-OR configuration. In the illustrated example, both the first rectifier and the second rectifier are Schottky diodes. However, any other type(s) and/or configuration(s) of rectifier may additionally or alternatively be used such as, for example, a diode, a transistor, a switch, a synchronous rectifier, etc. In the illustrated example, the first rectifier is coupled to the power supply 110 and the second rectifier is coupled to the generator power receiver 320 via an isolated flyback converter. The isolated flyback converter of the power output controller 350 receives a pulse width modulated signal from the mode controller 340. While in the illustrated example, the example power output controller 350 is implemented using two rectifiers in a wired-OR configuration and an isolated flyback converter 435, any other configuration of the example power output controller 350 may additionally or alternatively be used. For example, the power output controller 350 may be implemented by one or more transistors such as, for example, field effect transistors (FETs), a buck-boost converter, a non-isolated flyback converter, etc.

Figure 4:
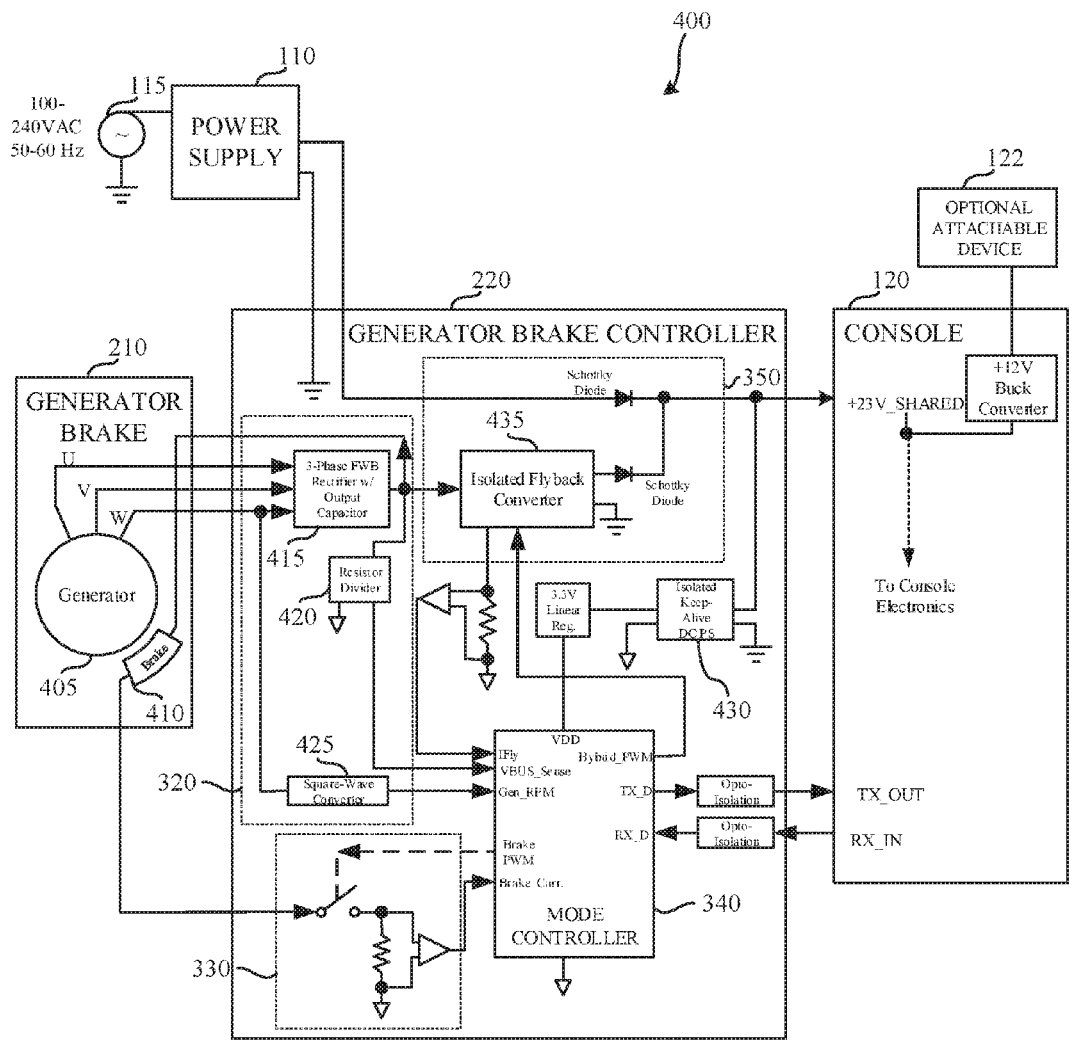
FIG. 4 is a circuit diagram illustrating an example implementation of the example exercise machine of FIG. 2.

FIG. 4 is a circuit diagram 400 illustrating an example implementation of the example exercise machine 100 of FIG. 2. The circuit diagram 400 includes the power supply 110, the generator brake 210, the generator brake controller 220, and the console 120. In the illustrated example of FIG. 4, the generator brake controller 220 includes the generator power receiver 320, the brake controller 330, the mode controller 340, and the power output controller 350.

The generator brake 210 includes a generator 405, and a brake 410. The generator 405 is a three-phase permanent magnet outer rotor type generator. However, any other type of generator may additionally or alternatively be used. The rotor of the generator includes a flywheel. The brake 410 is an electromagnetic brake that is attached to the flywheel, and adds resistance for the user. The electricity to power the brake 410 is received from the generator power receiver 320, which rectifies the three-phase output of the generator 405. Accordingly, the electricity used to power the brake 410 is generated by the generator 405.

As described above, the generator power receiver 320 includes a three-phase rectifier 415, a resistor divider 420, and a square wave converter 425. The three-phase rectifier 415 receives three-phase power from the generator brake 210 and creates a rectified output. The rectified output is used to power the brake 410. The rectified output is also provided to the power output controller 350. The resistor divider 420 reduces the rectified output of the three-phase rectifier 415 so that the rectified output can be measured by the mode controller 340. The square wave converter 425 of the generator power receiver 320 converts one of the three phases received from the generator 405 so that the mode controller 340 can accurately measure the rotations per minute of the rotor of the generator 405.

In the illustrated example, the circuit 400 further includes an isolated keep-alive direct current (DC) power supply 430. The isolated keep-alive DC power supply 430 receives power from the output of the power output controller 350. Accordingly, when no power is generated by the generator 405, the generator brake controller 220 can remain powered via the power provided by the power supply 110.

In the illustrated example, the mode controller 340 provides a pulse width modulated signal to the isolated flyback converter 435. The isolated flyback converter 435 of the power output controller 350 sets the power transmitted from the generator 405 to the console 120 based on the pulse width modulated signal received from the mode controller 340. While in the illustrated example, a pulse width modulated signal us used, any other type of control signal may additionally or alternatively be used such as, for example, a digital control signal, an analog control signal, etc.

If the power output from the generator power receiver 320 and received by the isolated flyback converter 435 is sufficiently lower than the power received from the power supply 110, the isolated flyback converter 435 is set to enable power to be transmitted from the power supply 110 to the console 120. Conversely, if the power output from the generator power receiver 320 and received by the isolated flyback converter 435 is sufficiently higher than the power received from the power supply 110, the isolated flyback converter 435 is set to transmit power from the generator power receiver 320 to the console 120.

When the power received from the power supply 110 and the generator power receiver 320 are approximately equal (e.g., within a threshold percentage of each other, such as, for example, thirty percent), the power provided to the console 120 is sourced from both the power supply 110 and the generator power receiver 320. In the illustrated example, the power sourced from the power supply 110 and the generator power receiver 320 is not equal. Slight changes of the generator power receiver 320 reference voltage will increase or decrease the amount of load current provided by the generator power receiver 320.

In the illustrated example, the mode controller 340 uses two control loops to regulate the power provided to the console 120. The primary control loop regulates the load torque on the generator 405 by controlling the brake current. The torque can be calculated using the brake current and power supply current. However, second order effects makes deriving a closed form solution to this relationship difficult. In the illustrated example, the torque is calculated using the following equation:

$$\text{Torque} = k0 + kps*i\_ps + k2*i\_brake\string^2 + k1*i\_brake$$

In the illustrated example, k0, kps, k1, k2 are constants; i_ps is the current provided from the three-phase rectifier 415 to the isolated flyback converter 420, and i_brake is the brake current. In examples where a different configuration of the generator brake 210 is used, the torque equation may be varied so that a proper amount of resistance is experienced by the user during the workout. While in the illustrated example a second order equation is used to calculate the torque, in other examples other equations and/or formulas may additionally or alternatively be used.

The mode controller 340 of the illustrated example implements a digital proportional integral (PI) control and minimizes torque error using the following equation:

$$\text{Error\_torque}(t) = \text{torque\_ref}(t) - \text{torque\_cal}(t)$$

In the above formula, torque_ref is a constant times the power generated by the user divided by an RPM. The power generated by the user is measured in watts. The RPM is the rotational speed (revolutions per minute) of the rotor of the generator 405 as measured via the square wave generator 425.

A second PI control loop is implemented by the mode controller 340 to minimize the power supply current error signal using the following equation:

$$\text{Error\_ips} = \text{ips\_ref} - \text{ips}$$

In the above formula, ips_ref is the desired amount of current to be delivered by the power supply. In some examples, the reference can be set to zero where it is desired to disable hybrid control such as, for example, low rpm scenarios, low generator voltage scenarios, and/or very light user power scenarios.

Figure 5:
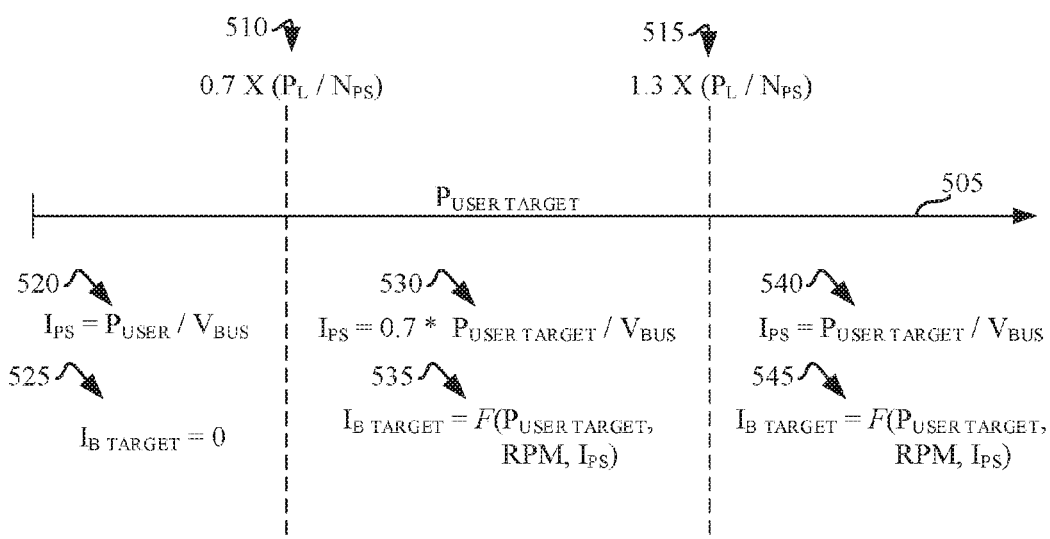
FIG. 5 is a diagram illustrating three example regions of operation of the example generator brake controller of FIG. 3.

FIG. 5 is a diagram illustrating three example modes of operation of the example generator brake controller of FIG. 3. In the illustrated example of FIG. 5, a horizontal line 505 represents the target power produced by the user in watts ($P_{USER\ TARGET}$). The left side of the horizontal line 505 represents a low wattage, while the right side of the horizontal line 505 represents a high wattage.

A first vertical line represents a lower threshold 510. In the illustrated example, the lower threshold 510 is equivalent to seven tenths of the total power load ($P_L$) divided by a flyback power supply efficiency ($N_{PS}$). In the illustrated example the $P_L$ represents the total power of the console 120 including any attachments such as, for example, a television, a tablet computer, a smartphone, etc. The $N_{PS}$ equals $P_L$ divided by the flyback power supply input power ($P_{PS}$). The $P_{PS}$ equals the rectified generator output voltage ($V_{BUS}$) times the flyback power supply input current ($I_{PS}$). A second vertical line represents an upper threshold 515. The upper threshold 515 is equivalent to one and three tenths of the $P_L$ divided by $N_{PS}$.

When $P_{USER\ TARGET}$ is less than the lower threshold 510, the mode controller 340 sets the flyback power supply input current ($I_{PS}$) 520 equal to the resistance felt by the user measured in watts ($P_{USER}$) divided by the $V_{BUS}$. When $P_{USER\ TARGET}$ is greater than the lower threshold 510 and less than the upper threshold 515, the mode controller 340 sets the flyback power supply input current ($I_{PS}$) 530 equal to seven tenths of the resistance felt by the user measured in watts ($P_{USER}$) divided by the $V_{BUS}$. When $P_{USER\ TARGET}$ is greater than the upper threshold 515, the mode controller 340 sets the flyback power supply input current ($I_{PS}$) 540 equal to the resistance felt by the user measured in watts ($P_{USER}$) divided by the $V_{BUS}$.

When $P_{USER\ TARGET}$ is less than the lower threshold 510, the mode controller 340 sets the target brake current ($I_{B\ TARGET}$) to zero 525. When $P_{USER\ TARGET}$ is greater than the lower threshold 510 and less than the upper threshold 515, the mode controller 340 sets the $I_{B\ TARGET}$ to a function of $P_{USER\ TARGET}$, an RPM of the rotor of the generator 405, and $I_{PS}$ 535. In the illustrated example of FIG. 5, the brake current ($I_{B\ TARGET}$) is calculated using the torque calculations described above. When $P_{USER\ TARGET}$ is greater than the upper threshold 515, the mode controller 340 sets the $I_{B\ TARGET}$ to a function of $P_{USER\ TARGET}$, an RPM of the rotor of the generator 405, and $I_{PS}$ 545.

While an example manner of implementing the example generator brake controller 220 of FIG. 2 has been illustrated in FIGS. 3 and/or 4, one or more of the elements, processes, and/or devices illustrated in FIGS. 3 and/or 4 may be combined, divided, re-arranged, omitted, eliminated, and/or implemented in any other way. Further, the example generator power receiver 320, the brake controller 330, the mode controller 340, the power output controller 350, and/or, more generally, the example generator brake controller 220 of FIGS. 2, 3, and/or 4 may be implemented by hardware, software, firmware, and/or any combination of hardware, software, and/or firmware. Thus, for example, any of the example generator power receiver 320, the brake controller 330, the mode controller 340, the power output controller 350, and/or, more generally, the example generator brake controller 220 of FIGS. 2, 3, and/or 4 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example generator power receiver 320, the brake controller 330, the mode controller 340, and/or the power output controller 350 are hereby expressly defined to include a tangible computer readable medium such as a memory, DVD, CD, Blu-ray, etc. storing the software and/or firmware. Further still, the example generator brake controller 220 of FIGS. 2, 3, and/or 4 may include one or more elements, processes and/or devices in addition to, or instead of, those illustrated in FIGS. 3 and/or 4, and/or may include more than one of any or all of the illustrated elements, processes, and devices.

Flowcharts representative of example methods 600 and/or 700 for implementing the generator brake controller 220 of FIGS. 2, 3, and/or 4 is shown in FIGS. 6, 7A, 7B, 7C, and/or 7D. In this example, the methods 600 and/or 700 may be implemented by a program for execution by a processor such as the processor 812 shown in the example processor platform 800 discussed below in connection with FIG. 8. A processor is sometimes referred to as a microprocessor or a central processing unit (CPU). The program may be embodied in software stored on a tangible computer-readable medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 6, 7A, 7B, 7C, and/or 7D, many other methods of implementing the example generator brake controller 220 of FIGS. 2, 3, and/or 4 may alternatively be used. For example, the order of execution of the blocks may be changed, and/or some of the blocks described may be changed, eliminated, or combined.

As mentioned above, the example methods of FIGS. 6, 7A, 7B, 7C, and/or 7D may be implemented using coded instructions (e.g., computer-readable instructions) stored on a tangible computer-readable medium such as a computer-readable storage medium (e.g., a hard disk drive, a flash memory, a read-only memory (ROM), a compact disk (CD), a digital versatile disk (DVD), a cache, a random-access memory (RAM)) and/or any other storage media in which information is stored for any duration (e.g., for extended time periods, permanently, brief instances, for temporarily buffering, and/or for caching of the information). As used herein, the term tangible computer-readable medium is expressly defined to include any type of computer readable storage medium and to exclude propagating signals and to exclude transmission media. Additionally or alternatively, the example process of FIG. 6 may be implemented using coded instructions (e.g., computer-readable instructions) stored on a non-transitory computer-readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable medium and to exclude propagating signals and to exclude transmission media. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 6:
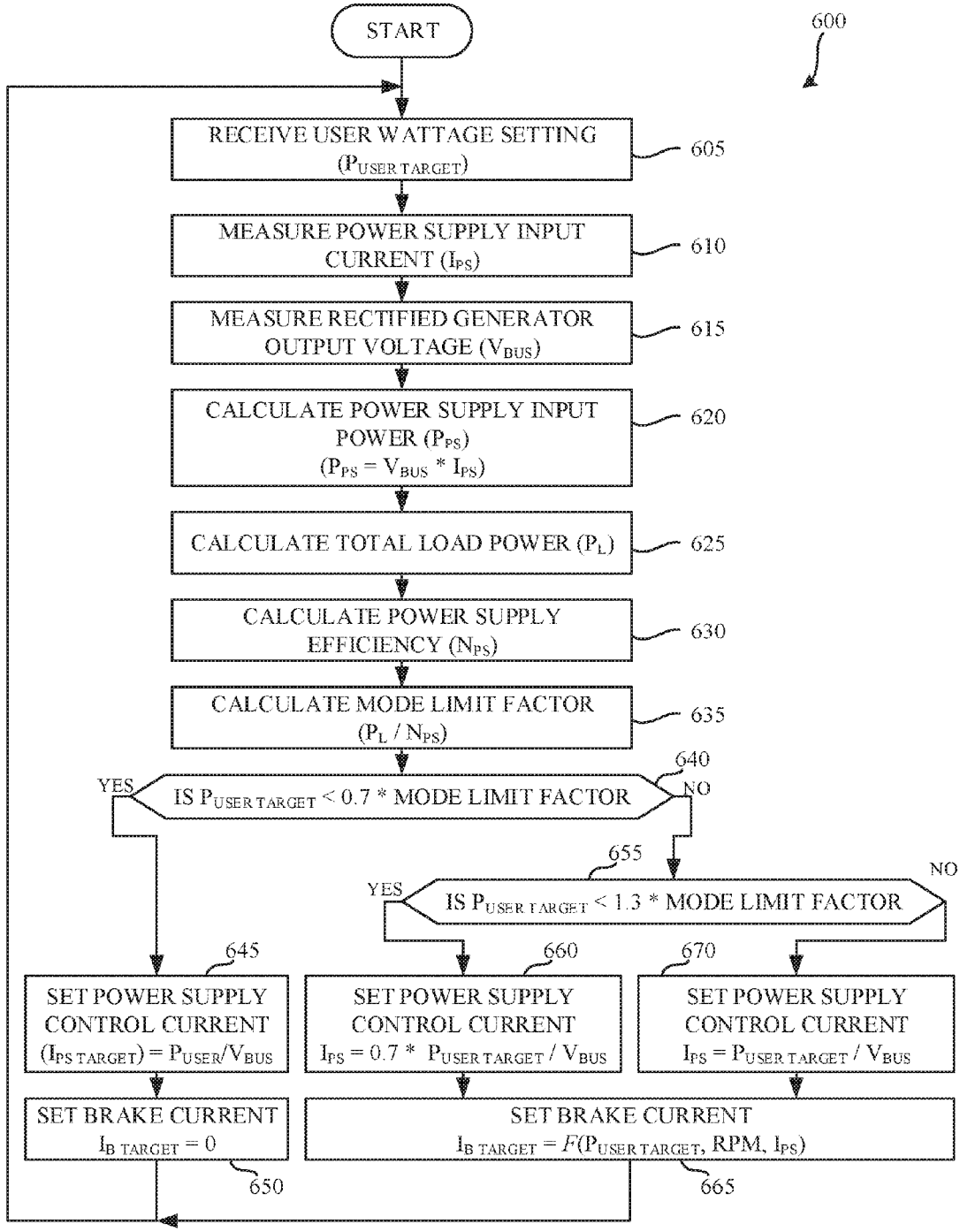
FIG. 6 is a flowchart representative of an example method that may be performed to implement the example generator brake controller of FIG. 3 using three regions of operation.

The example method 600 of FIG. 6 begins execution when the user begins operating the exercise machine 100 (e.g., when rotation of the rotor of the generator 405 is detected). However, in some examples, the method 600 operates continuously while the exercise machine 100 receives power from the power supply 110.

In the illustrated example, the mode controller 340 receives a user wattage setting ($P_{USER\ TARGET}$). (block 605). In the illustrated example, the $P_{USER\ TARGET}$ is received from the console 120. In other examples, $P_{USER\ TARGET}$ is calculated from other user input including, for example, a desired heart rate, a desired resistance level, an age, a weight, a desired amount, and/or rate of calories to be burned. However, the $P_{USER\ TARGET}$ may be received in any other fashion.

The mode controller 340 measures the flyback power supply input current ($I_{PS}$). (block 610). The mode controller 340 measures a rectified generator output voltage ($V_{BUS}$). (block 615). Using the measured values, the mode controller 340 calculates the flyback power supply input power ($P_{PS}$). (block 620). In the illustrated example $P_{PS}$ is calculated as $V_{BUS}$ times $I_{PS}$.

The mode controller 340 calculates a total load power of the console, including any attachments ($P_L$). (block 625). In the illustrated example, $P_L$ is calculated as the flyback output voltage ($V_O$) times the total load current ($I_L$). The mode controller 340 calculates the flyback power supply efficiency ($N_{PS}$). (block 630). In the illustrated example, $N_{PS}$ is calculated as $P_L$ divided by $P_{PS}$, which is the rectified generator output voltage ($V_{BUS}$) times the flyback power supply input current ($I_{PS}$). The mode controller 340 then calculates the mode limit factor as $P_L$ divided by $N_{PS}$ (block 635).

The mode controller 340 determines whether $P_{USER\_TARGET}$ is less than seven tenths of the mode limit factor. (block 640). If $P_{USER\_TARGET}$ is less than seven tenths of the mode limit factor, the mode controller 340 sets the flyback power supply input current ($I_{PS}$) equal to the resistance felt by the user measured in watts ($P_{USER}$) divided by the $V_{BUS}$ (block 645). The mode controller 340 sets the target brake current ($I_{B\_TARGET}$) to zero. (block 650).

If $P_{USER\_TARGET}$ is not less than seven tenths of the mode limit factor, the mode controller determines whether $P_{USER\_TARGET}$ is less than one and three tenths of the mode limit factor. (block 655). When $P_{USER\_TARGET}$ is not less than seven tenths of the mode limit factor and lesser than one and three tenths of the mode limit factor, the mode controller 340 sets the flyback power supply input current ($I_{PS}$) equal to seven tenths of the resistance felt by the user measured in watts ($P_{USER}$) divided by the $V_{BUS}$. (block 660). The mode controller then sets the $I_{B\_TARGET}$ to a function of $P_{USER\_TARGET}$, an RPM of the rotor of the generator 405, and $I_{PS}$. (block 665).

When $P_{USER\_TARGET}$ is not lesser than one and three tenths of the mode limit factor, the mode controller 340 sets the flyback power supply input current ($I_{PS}$) equal to seven tenths of the resistance felt by the user measured in watts ($P_{USER}$) divided by the $V_{BUS}$, (block 670). The mode controller then sets the $I_{B\_TARGET}$ to a function of $P_{USER\_TARGET}$, an RPM of the rotor of the generator 405, and $I_{PS}$. (block 665). Control then proceeds to block 605 where the mode controller receives the user wattage setting.

The example method 700 of FIGS. 7A, 7B, 7C, and 7D begins execution when the user begins operating the exercise machine 100 (e.g., when rotation of the rotor of the generator 405 is detected). However, in some examples, the method 700 operates continuously while the exercise machine 100 receives power from the power supply 110. The example method 700 illustrates an example wherein the generator brake controller 220 does not have separate modes of operation.

The mode controller 340 sets initial control loop variables. (block 702). The power supply duty cycle ($D_{PS}$) of the initial sample is set to one, which results in all electrical power sent to the console 120 being sourced from the power supply 110. The brake current duty cycle ($D_{BC}$) is set to one, which results in no resistance being applied by the brake. A mechanical constant (MECH) is set based on the type of the exercise machine. In the illustrated example, the exercise machine is a bike, and has a mechanical constant of 1.7. However, any other mechanical constant may additionally or alternatively be used. In addition, in other examples, any type of exercise machine having the same or any other mechanical constant may additionally or alternatively be used. For example, a cross trainer exercise machine may have a mechanical constant of 7.184.

The mode controller 340 measures the present brake current $I_{BRAKE}$. (block 704). The mode controller 340 also measures the present power supply current $I_{PS}$. (block 706). In addition, the mode controller 340 measures the present RPM (rotations per minute) value from the generator power receiver 320. (block 708). The mode controller 340 determines if a Torque reference value ($TORQUE_{REF}$) is received from the console 120. (block 710). If $TORQUE_{REF}$ is received from the console, control proceeds to block 716. If $TORQUE_{REF}$ is not received from the console, control proceeds to block 712, where the mode controller 340 receives a desired wattage value from the console ($WATTS_{USER\_SELECTED}$). (block 712). The mode controller 340 calculates the $TORQUE_{REF}$ using the following equation:

$$TORQUE_{REF} = WATTS_{USER\_SELECTED} * 63024 / (RPM*746) - MECH$$

In the illustrated example, the above equation is used for different types of exercise machine. However, in some examples, a different equation may be used to calculate $TORQUE_{REF}$ when a different type of exercise machine is used. In the illustrated example, the mode controller 340 calculates the $TORQUE_{REF}$ value. However, in some examples, the console 120 may calculate the $TORQUE_{REF}$ value and communicate the $TORQUE_{REF}$ value to the mode controller 340 via, for example, a serial bus.

The mode controller determines if $TORQUE_{REF}$ is greater than, for example, seventeen. (block 716). If $TORQUE_{REF}$ is not greater than seventeen, the mode controller 340 sets a constant $K_0$ to, for example, 0.8152. (block 718). If $TORQUE_{REF}$ is greater than seventeen, the mode controller 340 sets the constant K0 to, for example, 0.1. (block 720). The mode controller 340 also sets a power supply constant ($K_{PS}$), a constant $K_1$, and a constant $K_2$. (block 722). In the illustrated example, $K_{PS}$ is set to, for example, 24.706, $K_1$ is set to, for example, 5.5528 and $K_2$ is set to, for example, 25.235. In other examples, other constant values may be used. The mode controller 340 calculates a torque value $TORQUE_{CALC}$ (block 724) using the following equation:

$$TORQUE_{CALC} = K_0 + K_{PS}*I_{PS} + K_1*I_{BRAKE} + K_2*I_{BRAKE}^2$$

Figure 7A:
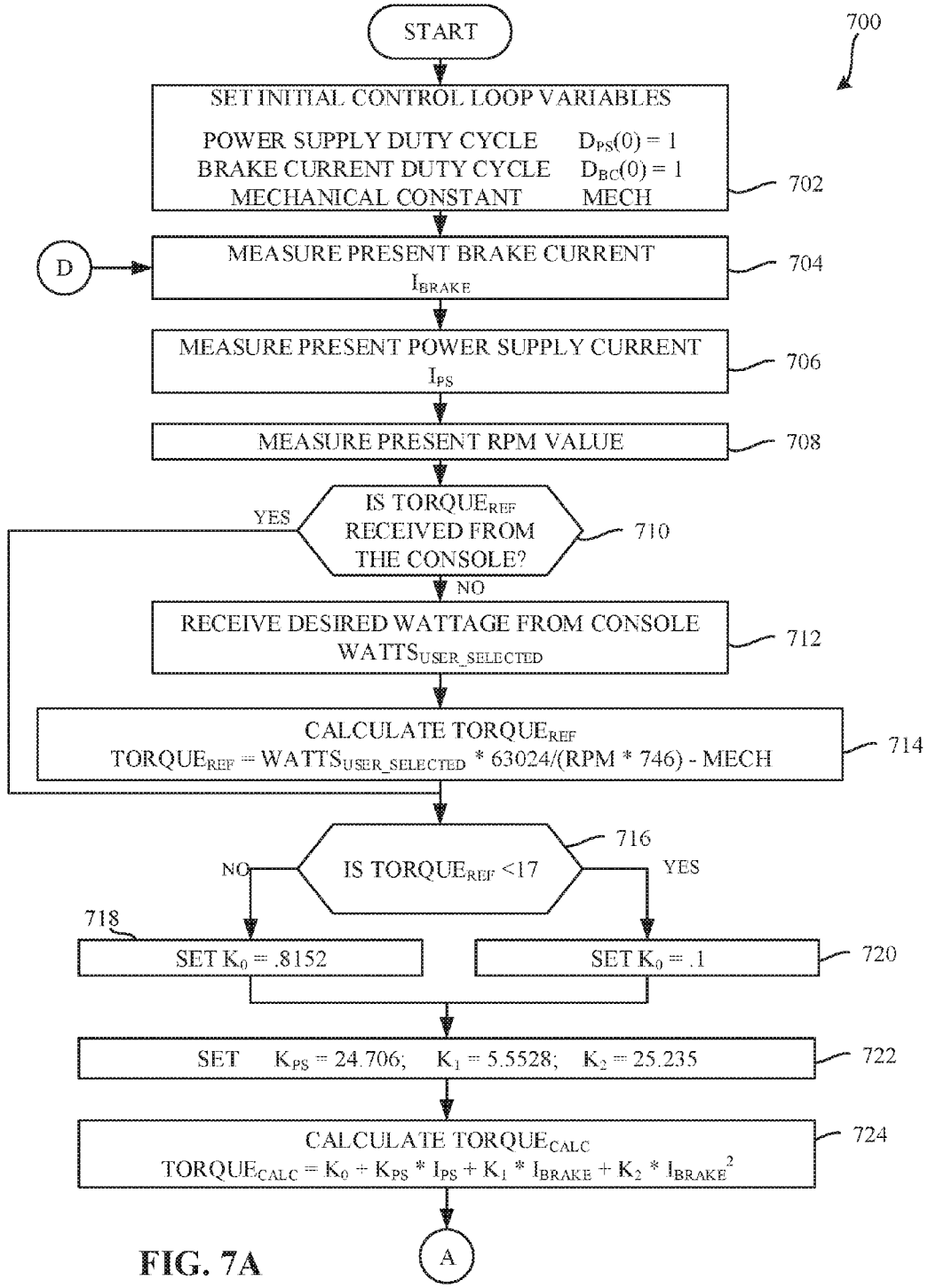
FIGS. 7A, 7B, 7C, and 7D are a flowchart representative of an example method that may be performed to implement the example generator brake controller of FIG. 3 using a single region of operation.
Figure 7B:
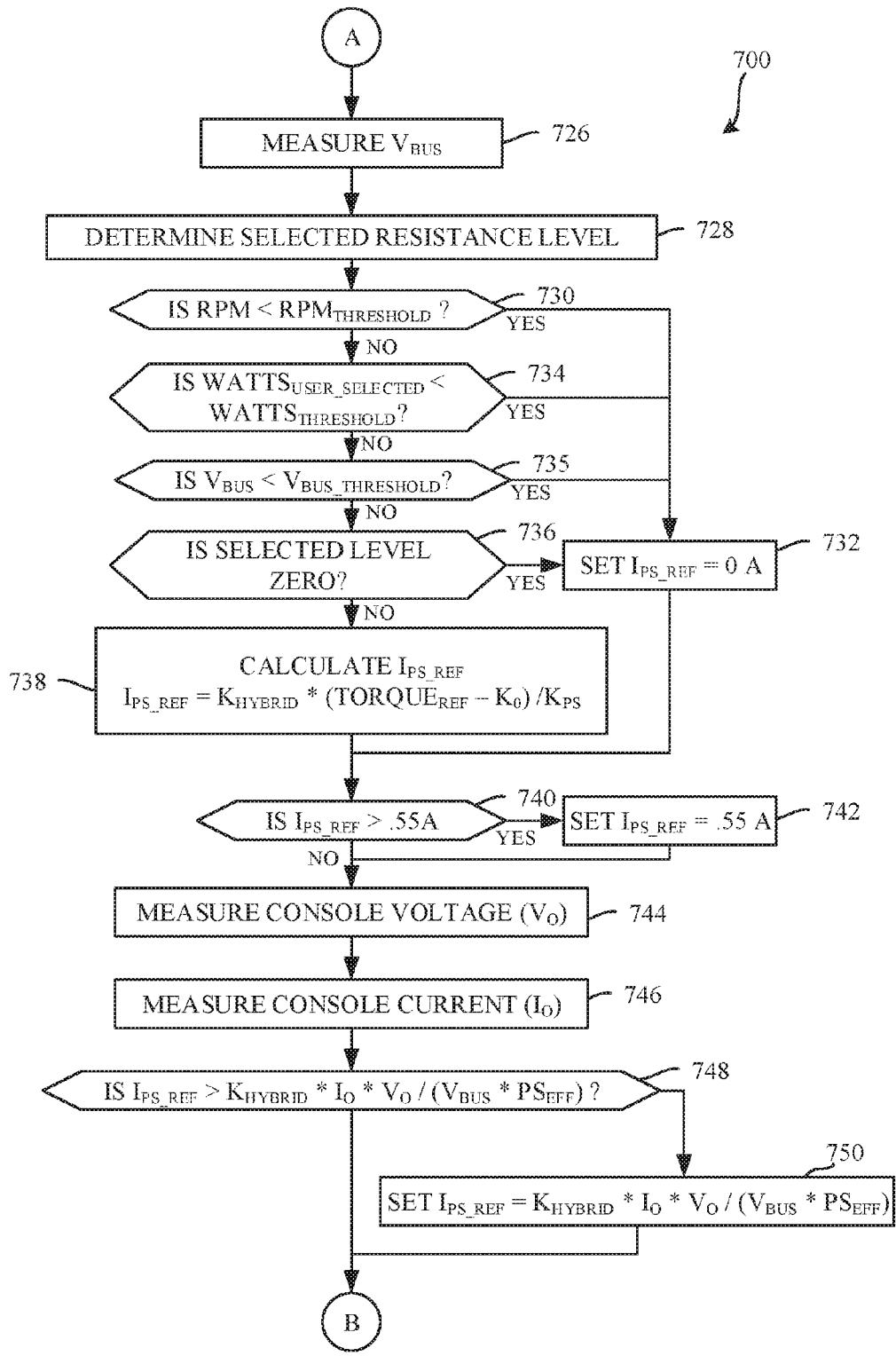
Figure 7C:
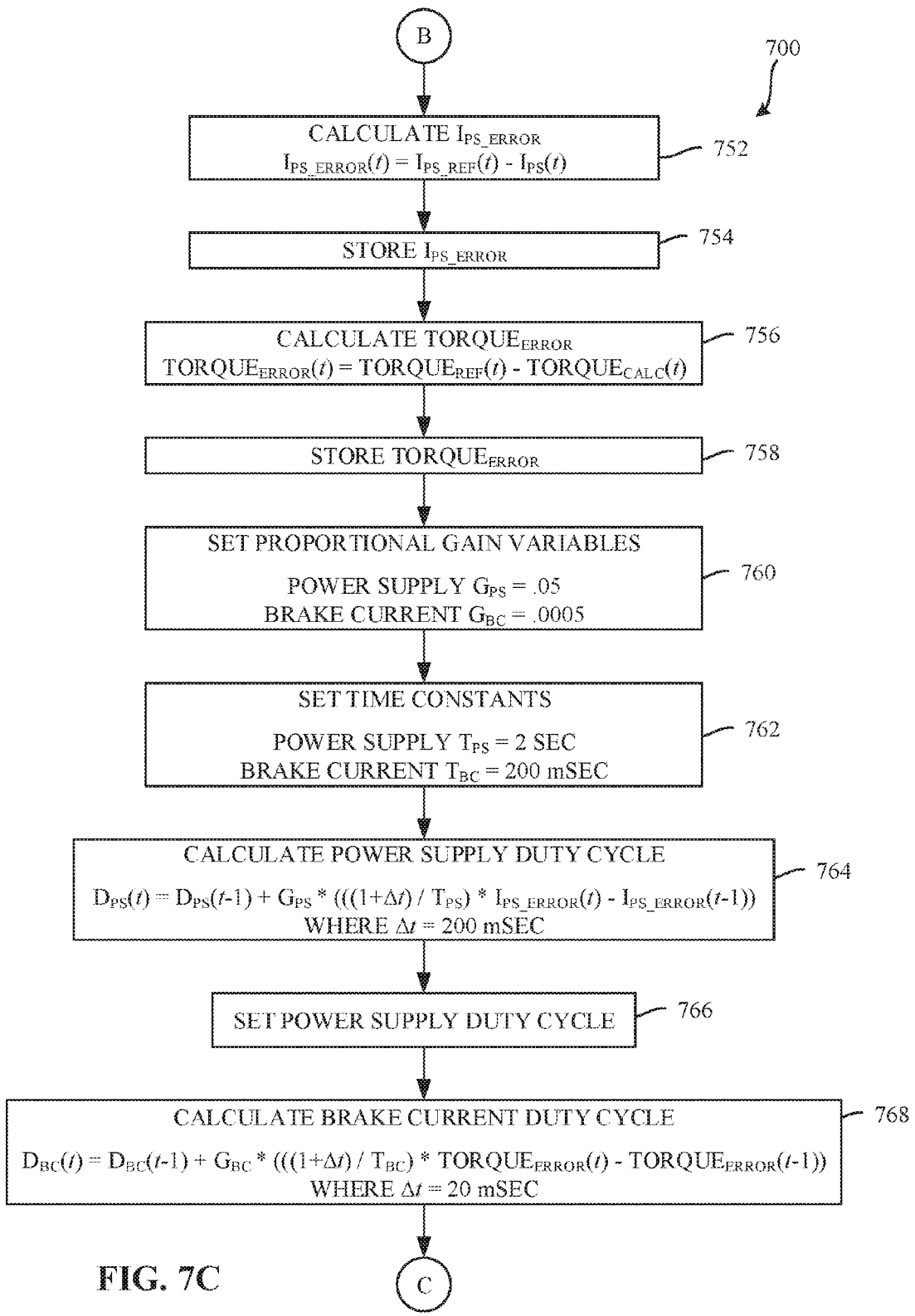
Figure 7D:
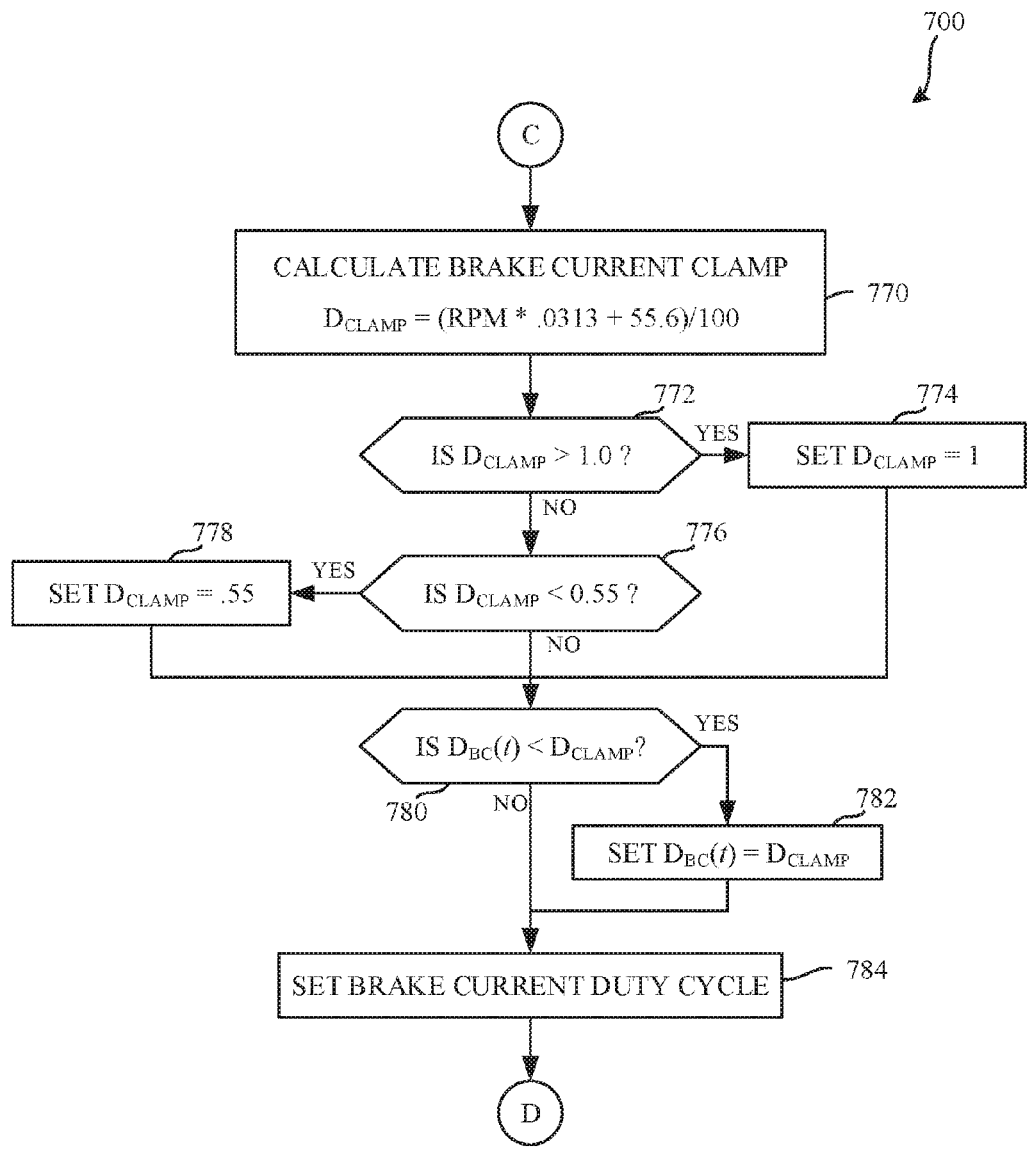

The mode controller 340 measures $V_{BUS}$. (block 726) (FIG. 7B). In the illustrated example, $V_{BUS}$ is the rectified generator output voltage received from the generator power receiver 320. The mode controller 340 determines if a resistance level has been selected via the console 120. (block 728). If the RPM is less than an RPM threshold (block 730), the $V_{BUS}$ is less than a $V_{BUS}$ threshold (block 734), the $WATTS_{USER\_SELECTED}$ is less than a $WATTS_{THRESHOLD}$ (block 735), or the selected level is zero (block 736), the mode controller sets a power supply reference current ($I_{PS\_REF}$) to zero amps. (block 732). In the illustrated example, the RPM threshold is, for example, three hundred and sixty rotations per minute, the $V_{BUS}$ threshold is, for example, fifty volts, and the $WATTS_{THRESHOLD}$ is, for example, sixty watts. However, any other threshold values may additionally or alternatively be used. If the RPM is not less than an RPM threshold (block 730), the $V_{BUS}$ is not less than a $V_{BUS}$ threshold (block 734), the $WATTS_{USER\_SELECTED}$ is not less than a $WATTS_{THRESHOLD}$ (block 735), and the selected level is not zero (block 736), the mode controller 340 calculates the power supply reference current ($I_{PS\_REF}$) (block 738) using the following equation:

$$I_{PS\_REF} = K_{HYBRID}*(TORQUE_{REF} - K_0)/K_{PS}$$

Where $K_{HYBRID}$ is a constant that sets the maximum power that will be supplied from the generator brake controller 220. In the illustrated example, $K_{HYBRID}$ is, for example, 0.9. However any other value may additionally or alternatively be used for $K_{HYBRID}$. If $I_{PS\_REF}$ is greater than, for example, 0.55 ampere (block 740), the mode controller 340 limits $I_{PS\_REF}$ to 0.55 ampere (block 742). The mode controller 340 also measures a console voltage ($V_O$). (block 744). In the illustrated example, the console voltage is the total voltage used by the console including any additional attachments (e.g., a television, a smartphone, etc.). In addition, the mode controller 340 measures a console current ($I_O$). (block 746). In the illustrated example, the console current is the total current drawn by the console including any additional attachments (e.g., a television, a smartphone, etc.).

The mode controller 340 determines if $I_{PS\_REF}$ is greater than $K_{HYBRID}*I_O*V_O/(V_{BUS}*P_{SEFF})$. (block 748). In the illustrated example, $PS_{EFF}$ is a constant value representing an efficiency of the power supply. In some examples, $PS_{EFF}$ is set to, for example, 0.6. However, any other value for $PS_{EFF}$ may additionally or alternatively be used. For example, the efficiency of the power supply may vary based on any other variable such as, for example, an input voltage, an output current, a load resistance, etc. If $I_{PS\_REF}$ is greater than $K_{HYBRID}*I_O*V_O/(V_{BUS}*PS_{EFF})$, the mode controller 340 sets $I_{PS\_REF}$ equal to $K_{HYBRID}*I_O*V_O/(V_{BUS}*PS_{EFF})$. (block 750).

The mode controller 340 also calculates an error current (block 752) (FIG. 7C) using the following equation:

$$I_{PS\_ERROR}(t)=I_{PS\_REF}(t)-I_{PS}(t)$$

The mode controller 340 stores the error current value in a memory of the mode controller 340. (block 754). Storing the error current value enables the error current value to be used in subsequent control loop calculations. The mode controller also calculates a torque error (block 756) using the following equation:

$$TORQUE_{ERROR}(t)=TORQUE_{REF}(t)-TORQUE_{CALC}(t)$$

The mode controller 340 stores the torque error in the memory of the mode controller 340. (block 758). Storing the torque error enables the torque error value to be used in subsequent control loop calculations.

The mode controller 340 sets proportional gain variables. (block 760). In the illustrated example, a power supply gain $(G_{PS})$ is set to, for example, 0.05, and a brake current gain $(G_{BC})$ is set to, for example, 0.0005. However, any other gain values may additionally or alternatively be used. For example, a different gain value may be used while the brake current is rising compared to when the brake current is falling. The mode controller 340 also sets time constants to be used in subsequent control loops (block 762). In the illustrated example, a power supply time constant $(T_{PS})$ is two seconds, and a brake current time constant $(T_{BC})$ is two hundred milliseconds. However, any other time constants may additionally or alternatively be used. The mode controller 340 also calculates a power supply duty cycle $(D_{PS})$ (block 764) using the following equation:

$$D_{PS}(t)=D_{PS}(t-1)+G_{PS}*(((1+\Delta t)/T_{PS})*I_{PS\_ERROR}(t)-I_{PS\_ERROR}(t-1))$$

In the above equation, $D_{PS}(t-1)$ represents the power supply duty cycle from the previous iteration of calculation. The above equation is an implementation of a proportional integral control equation. However, any other type of control equation may additionally or alternatively be used. In the first iteration of the calculation, the previous power supply duty cycle is one. In the above equation, $\Delta t$ is set to two hundred milliseconds. However, any other value for $\Delta t$ may alternatively be used. In the above equation, t represents the calculation for the current period, whereas t−1 represents the value of the function (e.g., $I_{PS\_ERROR}(t-1)$) stored in the previous period. The mode controller 340 sets the power supply duty cycle via the power output controller 350. (block 766).

The mode controller 340 also calculates a brake current duty cycle $(D_{BC})$ (block 768) using the following equation:

$$D_{BC}(t)=D_{BC}(t-1)+G_{BC}*(((1+\Delta t)/T_{BC})*TORQUE_{ERROR}(t)-TORQUE_{ERROR}(t-1))$$

In the above equation, $D_{BC}(t-1)$ represents the brake current duty cycle from the previous iteration of the calculation. The above equation is an implementation of a proportional integral control equation. However, any other type of control equation may additionally or alternatively be used. In the first iteration of the calculation, the previous brake current duty cycle is one. In the above equation, $\Delta t$ is set to twenty milliseconds. However, any other value for $\Delta t$ may alternatively be used. In the above equation, t represents the calculation for the current period, whereas t−1 represents the value of the function (e.g., $TORQUE_{ERROR}(t-1)$) stored in the previous period. Prior to setting the brake current via the brake controller, the mode controller clamps the brake current duty cycle to ensure that the user experiences the desired level of resistance from the exercise machine 100. The mode controller 340 calculates a brake current clamp $(D_{CLAMP})$ (block 770) (FIG. 7D) using the following equation:

$$D_{CLAMP}=(RPM*0.0313+55.6)/100$$

In the above equation, the brake current clamp is a function of RPM. However, any other properties, variables, etc. may additionally or alternatively be used in the brake current clamp equation. The mode controller 340 determines if the brake current clamp is greater than, for example, one (block 772) and, if so, the mode controller 340 sets the brake current clamp to one. (block 774). If the brake current clamp is not greater than one, the mode controller 340 determines if the brake current clamp is less than, for example, 0.55 (block 776). If the brake current clamp is less than 0.55, the mode controller sets the brake current clamp to 0.55 (block 778). The mode controller 340 also determines if the brake current duty cycle is less than the brake current clamp (block 780) and, if so, sets the brake current duty cycle to the brake current clamp. (block 782). If the brake current duty cycle is not less than the brake current clamp (block 780) and/or after clamping the brake current duty cycle (block 782), the mode controller sets the duty cycle of the brake controller 330 to the brake current duty cycle. (block 784). Control then proceeds to block 704 (FIG. 7A) where the control loop is repeated.

Figure 8:
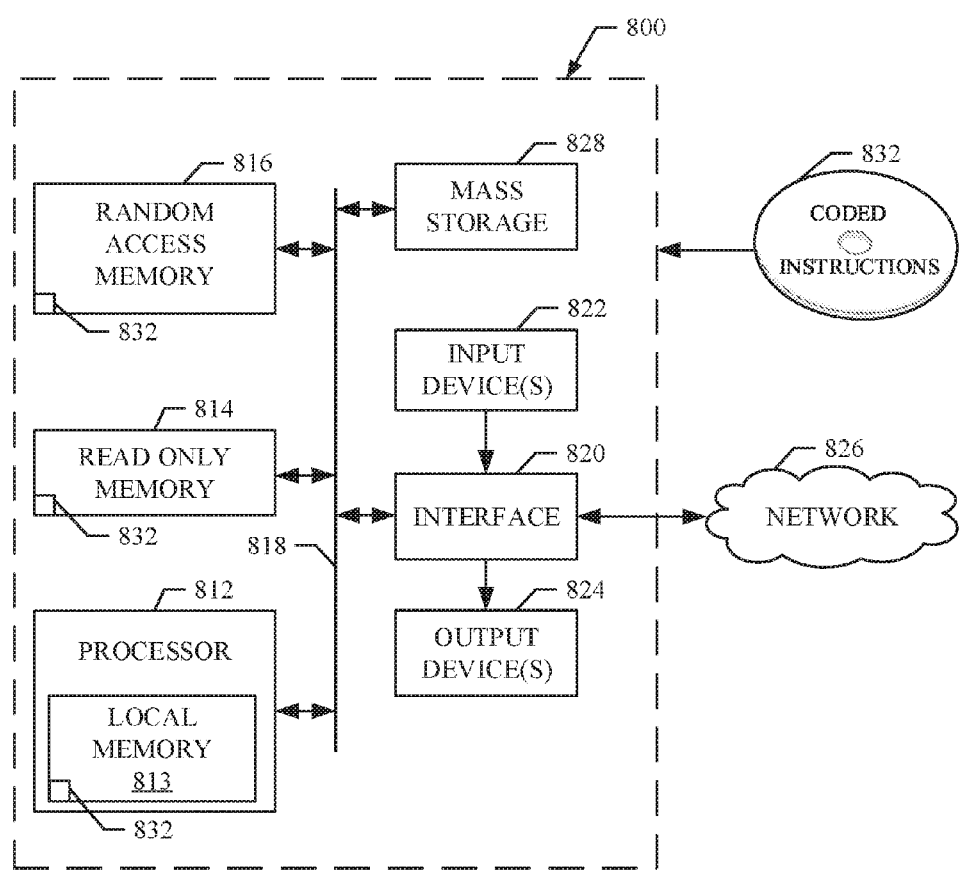
FIG. 8 is a block diagram of an example processor platform that may execute, for example, machine-readable instructions to implement the example method of FIG. 6, machine-readable instructions to implement the example method of FIGS. 7A, 7B, 7C, and 7D, and/or the example generator brake controller of FIG. 3.

FIG. 8 is a block diagram of an example processor platform 800 that may execute, for example, machine-readable instructions to perform the methods 600, 700 of FIGS. 6 and 7A-D to implement the example generator brake controller of FIG. 3. The processor platform 800 can be, for example, an exercise machine, a personal computer, a mobile phone (e.g., a cell phone), a personal digital assistant (PDA), or any other type of computing device.

The processor platform 800 of the instant example includes a processor 812. For example, the processor 812 can be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 also includes an interface circuit 820. The interface circuit 820 may be implemented by any type of interface standard, such as an Ethernet interface, a universal serial bus (USB), a serial bus, and/or a PCI express interface.

One or more input devices 822 are connected to the interface circuit 820. The input device(s) 822 permit a user to enter data and commands into the processor 812. The input device(s) can be implemented by, for example, a serial port, a keyboard, a mouse, a touchscreen, a track-pad, a trackball, isopoint and/or a voice recognition system.

One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.).

The processor platform 800 also includes one or more mass storage devices 828 for storing software and data. Examples of such mass storage devices 828 include floppy disk drives, hard drive disks, compact disk drives and digital versatile disk (DVD) drives.

The coded instructions 832 of FIG. 6 may be stored in the mass storage device 828, in the volatile memory 814, in the non-volatile memory 816, and/or on a removable storage medium such as a CD or DVD.

From the foregoing, it will appreciated that the above disclosed methods, apparatus and articles of manufacture enable power generated by a user during a workout to be used to power a console of an exercise machine in parallel with an external power source.

We claim:

1. An apparatus for use with an exercise machine, the apparatus comprising:
   a power receiver to measure a power output by a generator that is to convert movement of a moveable part into electric power, the power receiver to calculate a rotations per minute of the moveable part;
   a mode controller to calculate a power supply duty cycle based on the power output by the generator, the rotations per minute of the moveable part, and a user selected wattage; and
   a power output controller to control power provided to a console of the exercise machine based on the power supply duty cycle.

2. The apparatus of claim 1, further including the console.

3. The apparatus of claim 1, further including a power supply to receive power from a commercial power source, wherein the power output controller includes a first rectifier and a second rectifier in a wired-OR configuration, the first rectifier coupled to the power supply and the console, the second rectifier coupled to the generator and the console.

4. The apparatus of claim 3, wherein the first rectifier is a diode.

5. The apparatus of claim 3, wherein the first rectifier is a controlled switch.

6. The apparatus of claim 3, wherein the power supply duty cycle is a pulse width modulated signal, and further including a converter intermediate the second rectifier and the generator, the converter to receive the pulse width modulated signal.

7. The apparatus of claim 6, wherein the converter is an isolated flyback converter.

8. The apparatus of claim 6, wherein the converter is a switch.

9. The apparatus of claim 1, wherein the generator includes an electromagnetic brake controlled by a resistive load.

10. The apparatus of claim 1, wherein the generator is loaded by a controlled resistive load.

11. An apparatus for use with an exercise machine, the apparatus comprising:
    means for measuring a power output by a generator that is to generate electricity based on a user input;
    first means for calculating a rotations per minute of a moveable part;
    second means for calculating a power supply duty cycle based on the power output by the generator, the rotations per minute of the moveable part, and a user selected wattage; and
    means for controlling power provided to a console of the exercise machine based on the power supply duty cycle.

12. The apparatus of claim 11, further including the console.

13. The apparatus of claim 11, further including power supply means to receive power from a commercial power source, the means for controlling including a first rectifying means and a second rectifying means arranged in a wired-OR configuration, the first rectifying means coupled to the power supply means and the console, the second rectifying means coupled to the generator and the console.

14. The apparatus of claim 13, wherein the first rectifying means is a diode.

15. The apparatus of claim 13, wherein the first rectifying means is a controlled switch.

16. The apparatus of claim 13, wherein the power supply duty cycle is a pulse width modulated signal, and further including converting means intermediate the second rectifying means and the generator, the converting means to receive the pulse width modulated signal.

17. The apparatus of claim 16, wherein the converting means is an isolated flyback converter.

18. The apparatus of claim 16, wherein the converting means is a switch.

19. The apparatus of claim 11, wherein the generator includes an electromagnetic brake controlled by a resistive load.

20. The apparatus of claim 11, wherein the generator is loaded by a controlled resistive load.

* * * * *